Oct. 31, 1961     M. COVINI     3,006,459
DEVICE FOR TURNING OVER LINE SLUGS COMPOSED
BY A LINE-COMPOSING MACHINE
Filed Sept. 28, 1960     3 Sheets-Sheet 1
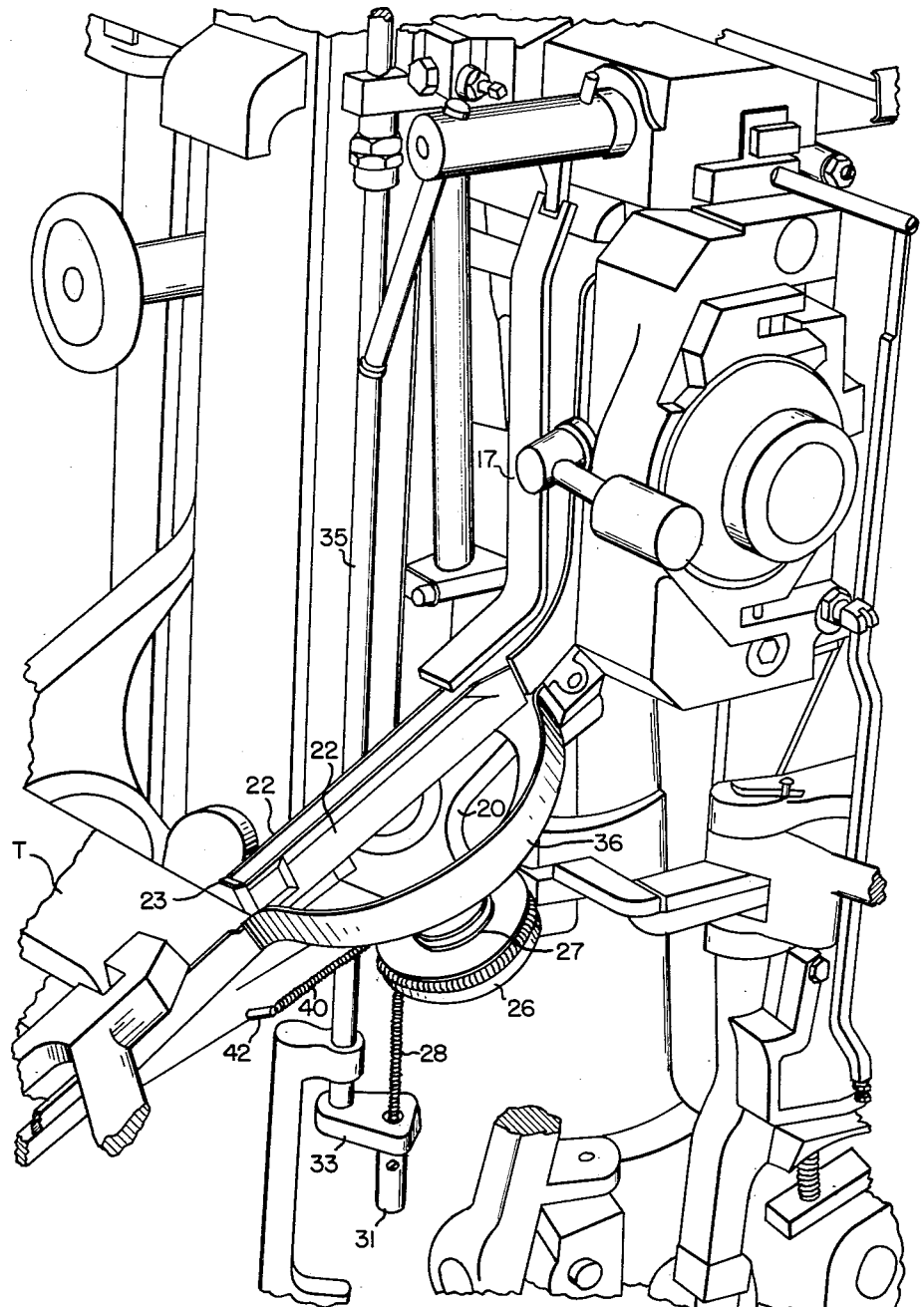
FIG. I
INVENTOR.
MARIO COVINI
BY
Attorney

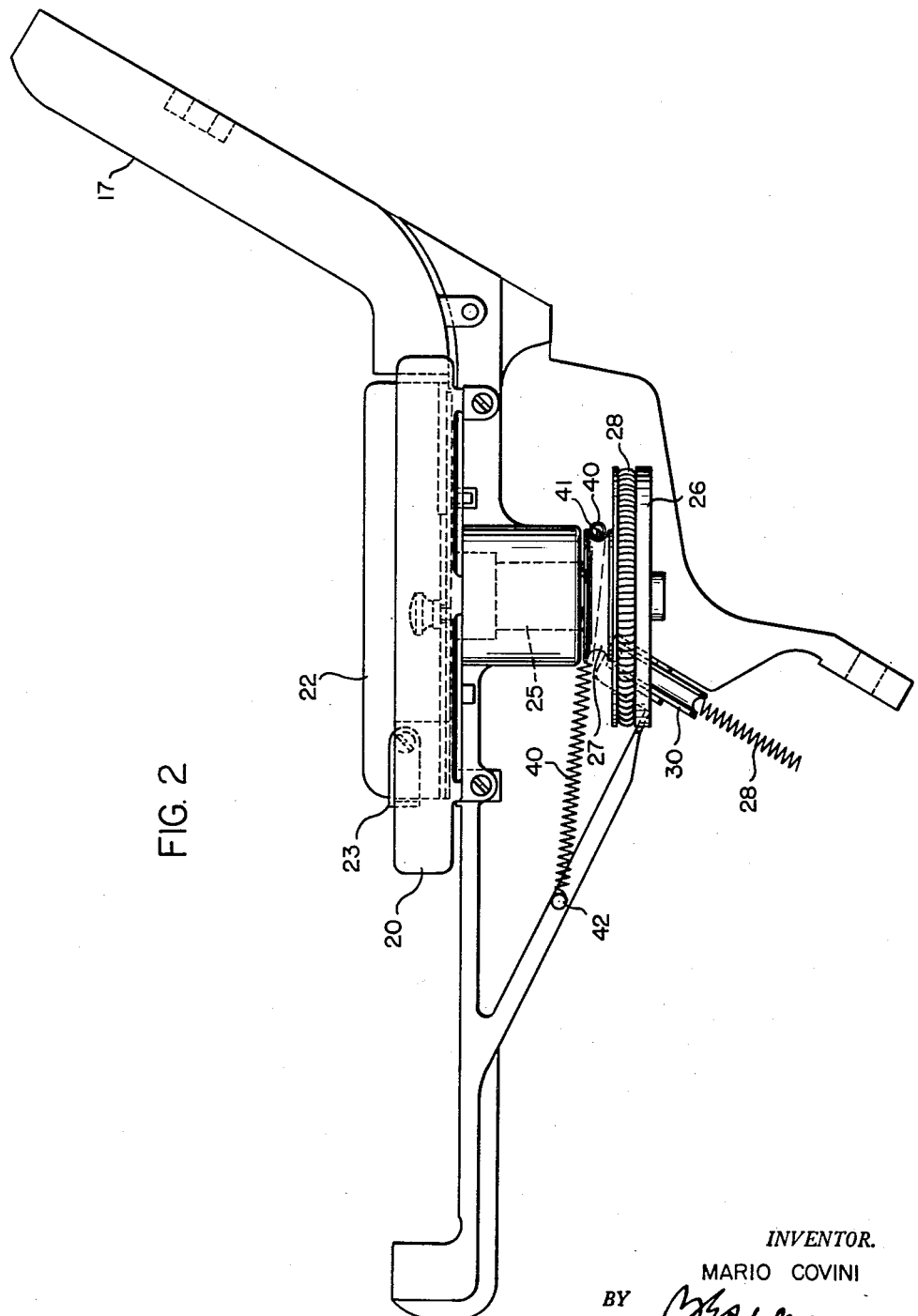

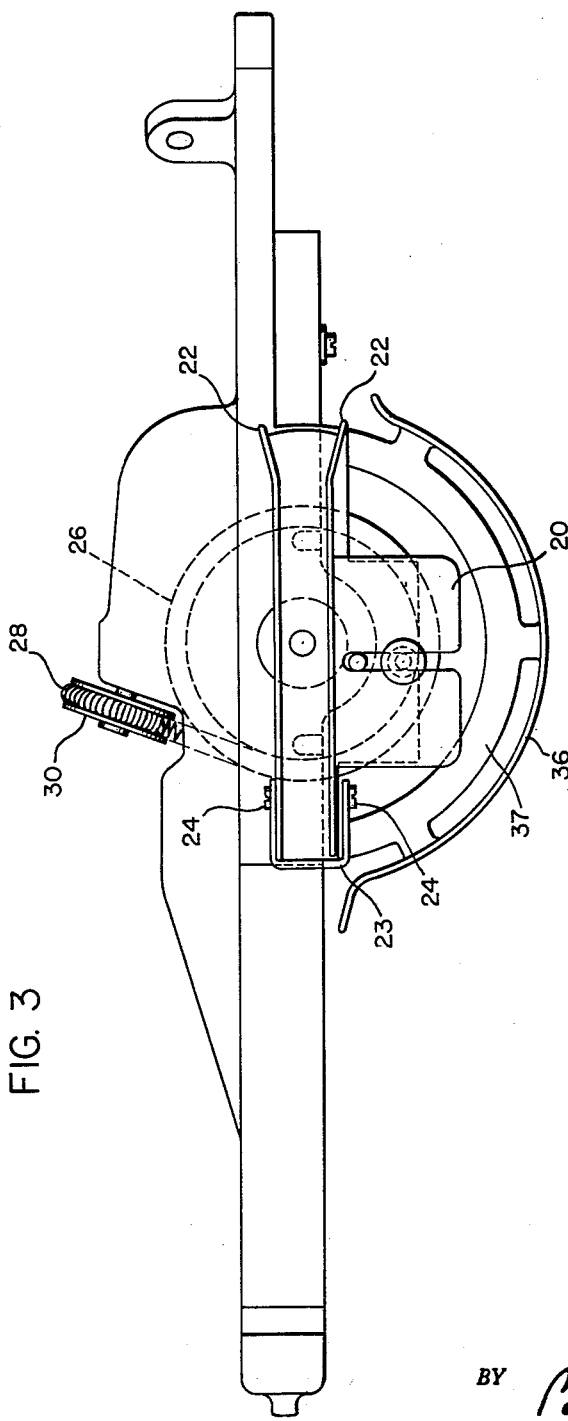

3,006,459
Patented Oct. 31, 1961

3,006,459
DEVICE FOR TURNING OVER LINE SLUGS COMPOSED BY A LINE-COMPOSING MACHINE
Mario Covini, Milan, Italy, assignor to Linotype S.p.A., Milan, Italy, a company of Italy
Filed Sept. 28, 1960, Ser. No. 60,767
Claims priority, application Italy Sept. 30, 1959
7 Claims. (Cl. 199—61)

The present invention relates to an attachment for line-composing machines and more particularly to apparatus for reversing type slugs composed by a line-composing machine. In a more specific aspect the present invention relates to an improvement on the apparatus described in my pending U.S. patent application Serial No. 813,152, filed May 14, 1959.

Line-composing machines, as conventionally constructed, compose and present the type slugs or typographic lines according to the orientation which is common for languages in which lines are read from left to right. It is necessary, therefore, where texts are being composed in languages in which the lines are read from right to left, for instance, Arabic and Hebrew, to turn the type slugs or typographic lines over after composition.

For obvious reasons of economy, efforts have been made to devise automatic devices for reversing or turning over the type slugs or typographic lines. All such devices as have previously been offered, however, have considerable complication in construction and, therefore, are very costly.

One object of the present invention is to provide a simple, economical attachment for a line-composing machine, which will be safe in operation, for automatically reversing type slugs or typographic lines after composition thereof.

Another object of the invention is to provide apparatus of the character described which can be operated from any part of the line-composing machine which has a reciprocal motion, either rectilinear or arcuate.

Another object of the invention is to provide apparatus of the character described, which is capable of operation, also, selectively under ordinary conditions for composition, that is, for lines which are to be read from left to right.

Other objects of the invention will appear hereinafter from the description, particularly when taken in connection with the accompanying drawings, and from the recital of the appended claims.

In the embodiment of the invention illustrated in the drawings there is a rotary turntable that is mounted adjacent the slug-collecting board or galley on which the line slugs composed by the machine are collected. On the turntable there are two parallel vertical walls which constitute a guide for the composed type slug delivered to the table. This table is adapted to be rotated through an angle of 180°, to reverse the delivered type slug. At one end of the guide there is provided a removable gate for holding the type slugs so that they do not slide out of the guide upon delivery thereto. The opposite end of the guide is open so that when the platform has completed its rotation through 180°, the slug slips out of the guide onto the collecting board or galley of the composing machine. If it is desired to compose texts which read from left to right, the gate is removed from the guide so that the slugs will slide out of the guide immediately after delivery to the table, and are not reversed.

The oscillating movement of the turntable is derived from the vertical reciprocation of the knife wiper rod of the composing machine. There is a first pulley secured to the journal of the turntable, and beneath this first pulley there is a second pulley whose axis of rotation is skew, that is, does not lie in the same plane, with the axis of the turntable. A flexible cable is fixed at one end to the first pulley and wound thereabout through an arc of at least 180°, and travels over the second pulley, and is connected at its other end with the knife wiper rod, so that as the knife wiper rod descends it will produce rotation of the turntable through 180° and consequent reversal of the line slugs delivered onto the turntable. A flexible return spring fixed at one end to a fixed part on the line-composing machine and fixed at its other end to a third pulley, which is coaxial with, and fixed to, the first pulley, returns the turntable to starting position as the knife wiper rod ascends again.

In the drawings:

FIG. 1 is a perspective view showing a line slug reversing mechanism constructed according to one embodiment of this invention and installed on a conventional line-composing machine;

FIG. 2 is a side elevation of this line slug reversing mechanism; and

FIG. 3 is a plan view of this line slug reversing mechanism.

Referring now to the drawings by numerals of reference, the slug reversing turntable is denoted at 20. It is provided with a guide 21 which has two vertically extending side walls 22. These are closable at one end by a swinging U-shaped gate 23, which is pivoted by means of pins 24 on the side walls of the guide. The turntable 20 is secured to a shaft 25 which is mounted for rotation on the line-composing machine.

Secured to the lower end of the shaft 25 to rotate therewith are two pulleys 26 and 27. Fixed at one end to the pulley 26 is a flexible cable 28 which is wound about pulley 26 through an arc of at least 180°. This flexible cable passes from pulley 26 over a sheave or pulley 30, the axis of which is skew with respect to that of the pulley 26. At its free end, the cable 28 is secured to a block 31. The block 31 is adapted to abut against the undersurface of an arm 33 which is secured to the conventional wiper bar 35 of the line composing machine. As the wiper bar 35 descends in the operation of the line composing machine, then, the block 31 is forced downwardly, causing the cable 28 to rotate the pulley 26 in a clockwise direction, as viewed in FIGS. 3 and 5, thereby to reverse the guide 21 and the line slug contained therein end for end.

An arcuate apron 36 prevents the slug from sliding out of the guide 21 during rotation of the turntable. This apron is secured to a support 37, which in turn is secured to a fixed part of the line composing machine. When the turntable has been swung through 180°, the open end of the guide 21 will be clear of the apron 36, however, and the composed line slug will slide out of this open end. The side walls 22 of the guide are flared outwardly at this open end, as shown in FIG. 3.

The flexible member 28 can be an elongatable element, if desired. Thus, it will be capable of acting as a safety means against excessive pulling stresses.

To the pulley 27 there is secured by means of pin 41 one end of a return or recoil spring 40. The other end of this spring is fixed by pin 42 to the line-composing machine.

In operation of the apparatus shown, a line slug drops from the slide 17 of the line-composing machine between the walls 22 of the guide 21 and is arrested by the end gate 23. The knife wiper bar or rod 35 is then depressed in the operation of the line-composing machine for wiping the knife which is cutting the next line slug. This causes the arm 33 to pull the flexible cable 28 downwardly by engagement with the block 31, causing the turntable 20 to be rotated through 180°, thus reversing the guide 21 and the line slug contained therein end for end. At the end of reversal, the line slug slides out of the open end of the guide 21 onto the slug stacking galley or collecting board T of the machine. As the bar or rod 35 is lifted again in the operation of the line-composing machine, the spring 40, which has been loaded during the rotation of the turntable, returns the turntable to its at-rest position.

The relative complication of the modern line-composing machines is such as to offer many possibilities of taking a drive off the machine to a slug-reversing turntable; and instead of using the reciprocation of the knife wiper bar 1 to effect movement of the turntable, the turntable can be connected to any other reciprocating member of the line-composing machine, which has sufficient movement, whether this member have a rectilinear or an arcuate reciprocation, so as to effect the desired oscillatory movement of the turntable.

If instead of composing lines which are to be read from right to left, it is desired to use the composing machine, without removing the slug-reversing attachment therefrom, to compose normal lines, that is, lines which read from left to right, all that is required to do is to remove the swinging gate 23 so that as each line slug is delivered from slide 17, it will slide through the guide 21 directly onto the correcting board or galley T.

While the invention has been described in connection with one embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. The combination with a line-composing machine having a part which is reciprocable in a straight line, of an oscillatory table, a guide member secured to said table to receive a line slug from said machine, and means operatively connected to said reciprocal part for rotating said table in one direction during movement of said part in one direction.

2. The combination with a line-composing machine having a part which is reciprocable in a straight line, of an oscillatory table, a guide member secured to said table to receive a composed line slug from said machine, means operatively connected to said reciprocal part for rotating said table in one direction during movement of said part in one direction, and means for returning said table to initial position upon movement of said part in the opposite direction.

3. The combination with a line-composing machine having a part which is reciprocable in a straight line, of an oscillatory table mounted on said machine for rotation about an axis inclined to the horizontal, a guide member secured to said table and having spaced guide walls to receive therebetween a line slug from said machine, said guide member being open at both ends, stop means fixed relative to said table to prevent the slug from sliding out one end of said guide member, and means operatively connected to said reciprocal part for rotating said table through 180° during movement of said part in one direction to reverse said slug end for end.

4. The combination claimed in claim 3, wherein an arcuate apron is secured to said machine to prevent a slug from sliding out of said guide member during said rotation of said table through 180°.

5. The combination claimed in claim 3, wherein said stop means is a gate which is removable to permit a slug delivered to said guide member to slide out the end normally closed by said stop means.

6. The combination with a line-composing machine having a reciprocal knife wiper rod, of an oscillatory table mounted on said machine for rotation about an axis inclined to the horizontal, a guide member secured to the table to extend diametrally across said table and having spaced guide walls to receive a composed line slug therebetween, a pulley fixed to rotate with said table, a flexible cable secured at one end to said table, means connecting said cable to said wiper rod to rotate said pulley and table in one direction through 180° upon movement of said rod in one direction, and means for returning said table to starting position upon movement of said rod in the opposite direction.

7. The combination as claimed in claim 6 wherein there is a gate removably mounted in one end of said guide member, said end of said guide member being the lower end when said table is in its starting position, and wherein means is provided preventing the slug from sliding out of the other end of said guide member during rotation of said table through the 180°.

No references cited.